(12) United States Patent
Hwang et al.

(10) Patent No.: US 7,768,620 B2
(45) Date of Patent: Aug. 3, 2010

(54) METHOD OF FABRICATING LIQUID CRYSTAL DISPLAY AND LIQUID CRYSTAL DISPLAY FABRICATED BY THE SAME

(75) Inventors: Jeong-ho Hwang, Suwon-si (KR);
Ho-min Kang, Suwon-si (KR);
Hee-young Park, Suwon-si (KR);
Byoung-hun Lee, Hwaseong-si (KR);
Seung-jun Lee, Yongin-si (KR);
Sung-teak Choi, Daegu-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 288 days.

(21) Appl. No.: 11/560,616

(22) Filed: Nov. 16, 2006

(65) Prior Publication Data
US 2007/0188688 A1    Aug. 16, 2007

(30) Foreign Application Priority Data
Feb. 13, 2006   (KR) ...................... 10-2006-0013782

(51) Int. Cl.
*G02F 1/13* (2006.01)
*G02F 1/1335* (2006.01)

(52) U.S. Cl. ........................................ 349/187; 349/96
(58) Field of Classification Search ...................... None
See application file for complete search history.

(56) References Cited

U.S. PATENT DOCUMENTS

| 7,218,372 | B2 * | 5/2007 | Lee et al. ..................... 349/153 |
| 7,259,804 | B2 * | 8/2007 | Yu et al. ....................... 349/12 |
| 7,307,686 | B2 * | 12/2007 | Jang ........................... 349/190 |
| 2003/0076473 | A1 * | 4/2003 | Sasaki ......................... 349/187 |

FOREIGN PATENT DOCUMENTS

| CN | 1453125 | 11/2003 |
| CN | 1510480 | 7/2004 |
| CN | 1538223 | 10/2004 |

* cited by examiner

*Primary Examiner*—Tina M Wong
(74) *Attorney, Agent, or Firm*—F. Chau & Associates, LLC (57) ABSTRACT

A method of fabricating a light weight and small size LCD, and an LCD fabricated by the same. The method of fabricating an LCD includes providing assembled mother substrates, wherein at least one of the mother substrates includes a polarizer, a buffer layer, and a transparent film sequentially stacked on an out-side thereof, and fabricating the assembled mother substrates as individual units by cutting the assembled mother substrates into unit cells.

19 Claims, 11 Drawing Sheets

METHOD OF FABRICATING LIQUID CRYSTAL DISPLAY AND LIQUID CRYSTAL DISPLAY FABRICATED BY THE SAME

CROSS-REFERENCE TO RELATED APPLICATION

This application claims priority to Korean Patent Application No. 10-2006-0013782 filed on Feb. 13, 2006, the disclosure of which is incorporated herein by reference in its entirety.

BACKGROUND OF THE INVENTION

1. Technical Field

The present disclosure relates to a method of fabricating a liquid crystal display (LCD) and, more particularly, to a method of fabricating a light weight and small size LCD, and an LCD fabricated by the same.

2. Discussion of the Related Art

A liquid crystal display (LCD) includes a liquid crystal display (LCD) panel comprising a first substrate and a second substrate, a liquid crystal layer interposed between the first and second substrate, and a driver integrated circuit (IC) attached to the LCD panel, The first and second substrates are combined and installed in a container. A completed LCD can be used in a variety of different display devices, for example, mobile devices such as cellular phones, laptop computers, and PDAs (Personal Digital Assistants).

In order to fabricate a mobile display device, an LCD panel is housed in a case having a window to expose a display region, and a passivation layer made of transparent glass or plastic is located in the window of the case to protect the LCD panel, which is exposed through the window of the case. However, the passivation layer occupies a significant amount of the thickness and weight of the mobile display device, the passivation layer can be broken by an external impact, and an additional step for adding the passivation layer to the case window decreases productivity.

SUMMARY OF THE INVENTION

Embodiment of the present invention provide a method for fabricating a light weight and small size LCD and an LCD fabricated by the same.

According to an embodiment of the present invention, a method of fabricating a liquid crystal display includes providing assembled mother substrates by sequentially stacking a polarizer, a buffer layer, and a transparent film on an out-side of at least one mother substrate, and fabricating the assembled mother substrates as individual units by cutting the assembled mother substrates into unit cells.

According to another embodiment of the present invention, an LCD includes a liquid crystal panel, a polarizer formed on an out-side of the liquid crystal panel, a buffer layer formed on the polarizer, and a transparent film formed on the buffer layer, wherein the perimeter of the liquid crystal panel, the polarizer, the buffer layer, and the transparent film have the same cutting plane.

According to another embodiment of the present invention, an LCD includes a liquid crystal panel, a polarizer formed on an out-side of the liquid crystal panel, a buffer layer formed on the polarizer, and a transparent film formed on the buffer layer, wherein the margin for misalignment between each of the liquid crystal panel, the polarizer, the buffer layer, and the transparent film is in a range of about 20 μm to about 30 μm.

BRIEF DESCRIPTION OF THE DRAWINGS

Exemplary embodiments of the present invention will be described in more detail hereinafter below with reference to the attached drawings in which.

DETAILED DESCRIPTION OF THE EXEMPLARY EMBODIMENTS

Exemplary embodiments of the present invention can be understood in more detail from the following description taken in conjunction with the accompanying drawings. The present invention may, however, be embodied in many different forms and should not be construed as being limited to the embodiments set forth herein.

Figure 1:
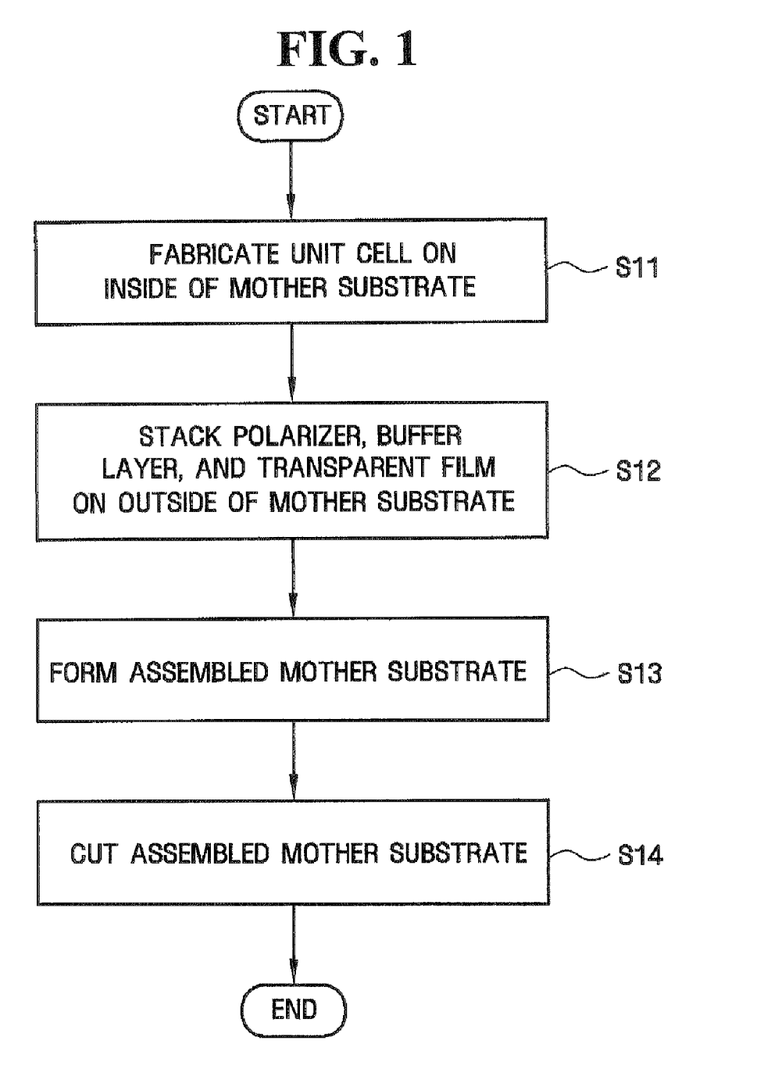
FIG. 1 is a flowchart illustrating a method of manufacturing an LCD according to an embodiment of the present invention.

Referring to FIG. 1, first, unit cells are formed on an in-side of each mother substrate. (S11). The "in-side" of the mother substrates 10, 90 means a side facing a liquid crystal layer, and an "out-side" means an opposite side to the "in-side".

More specifically, referring to FIGS. 2 through 6, TFT unit cells 30 are formed on the in-side of a first mother substrate 10, and color filter unit cells 110 are formed on the in-side of a second mother substrate 90.

Figure 2:
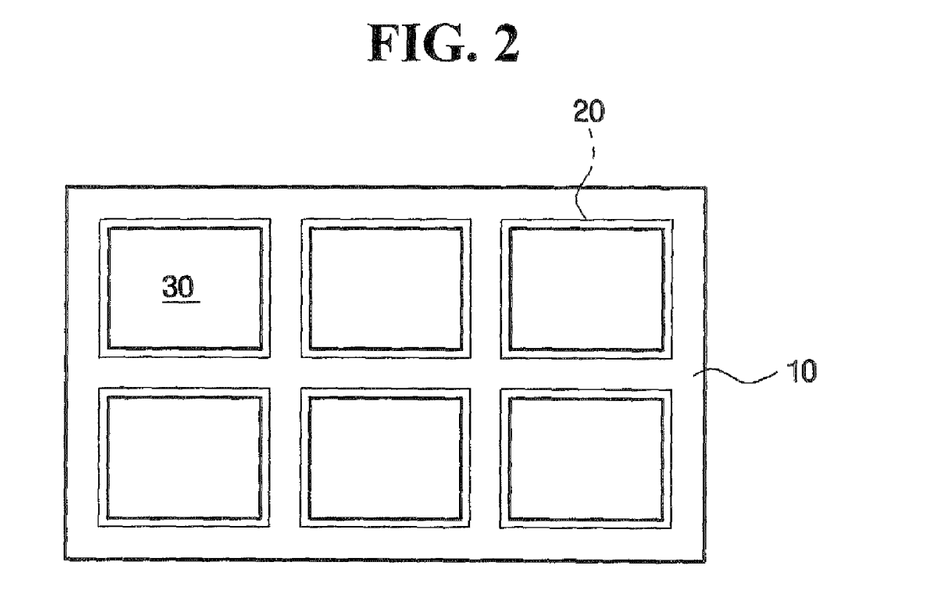
FIG. 2 is a conceptual view illustrating a first mother substrate and a thin film transistor (TFT) unit cell forming region formed at the first mother substrate, according to an embodiment of the present invention.

The first mother substrate 10 may have a size of, for example, 370 mm×479 mm or 550 mm×650 mm. The first mother substrate 10 can be formed with, for example, transparent inorganic moulding compounds such as planar glass or quartz, or, for example, transparent organic high polymeric moulding compounds such as polyethylene terephthalate (PET), polycarbonate (PC), or polyvinyl chloride (PVC).

The first mother substrate 10 comprises at least one TFT unit cell forming region 20. A TFT unit cell 30 is formed on each TFT unit cell forming region 20.

Figure 3:
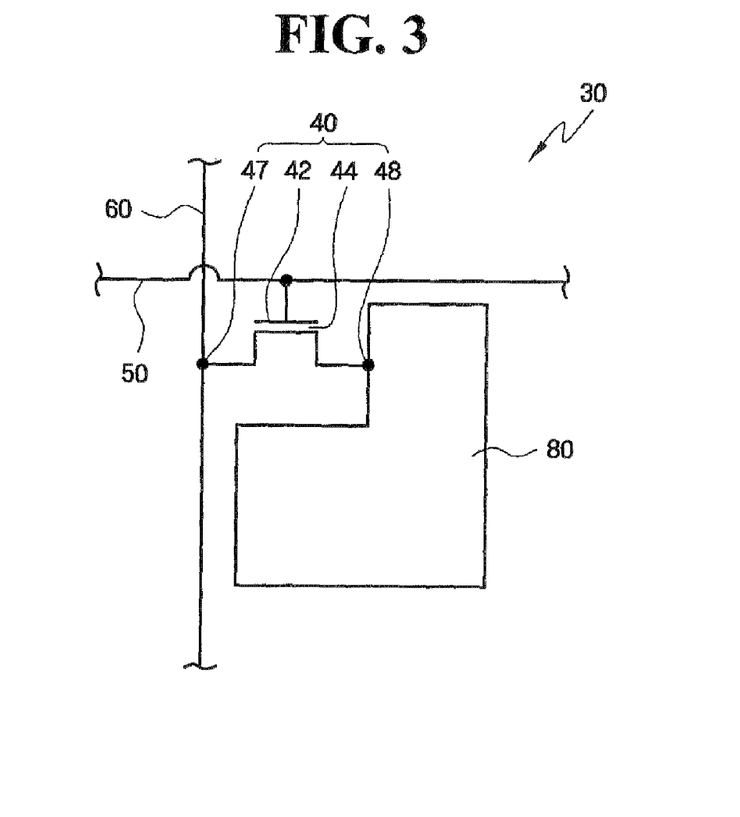
FIG. 3 is a conceptual view illustrating a TFT unit cell in the TFT unit cell forming region of FIG. 2, according to an embodiment of the present invention.
Figure 4:
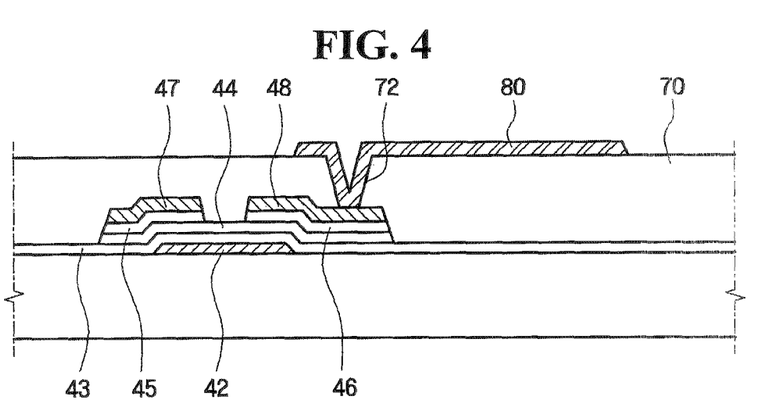
FIG. 4 is a sectional view of the TFT and pixel electrode of FIG. 3 according to an embodiment of the present invention.

As shown in FIGS. 3 and 4, the TFT unit cell 30 comprises a TFT 40, a gate line 50, a data line 60, and a pixel electrode 80.

The TFT 40 comprises a gate electrode 42, a gate insulating layer 43, a source electrode 47, a drain electrode 48, a semiconductor layer 44, and an ohmic contact layer 45, 46. A passivation layer 70 is formed on the TFT 40.

The gate line 50 is formed at a same time as the gate electrode 42 is formed. A single gate line 50 is connected to each gate electrode 42 in one line (row) among the TFTs 40 arranged in a matrix.

The data line 60 is formed at a same time as the source electrodes 47 and the drain electrodes 48 are formed. A single data line 60 is connected to each source electrode 47 is one column among the TFTs 40 arranged in a matrix.

The pixel electrode 80 is formed with a transparent material having good light transmissivity and good electrical conductivity. The pixel electrode 80, for example, can be formed with Indium Tin Oxide (ITO) or Indium Zinc Oxide (IZO). A pixel electrode 80 is formed for each TFT 40, and the pixel electrode 80 is electrically connected to the drain electrode 48 through a contact hole 72 formed in the passivation layer 70.

Figure 5:
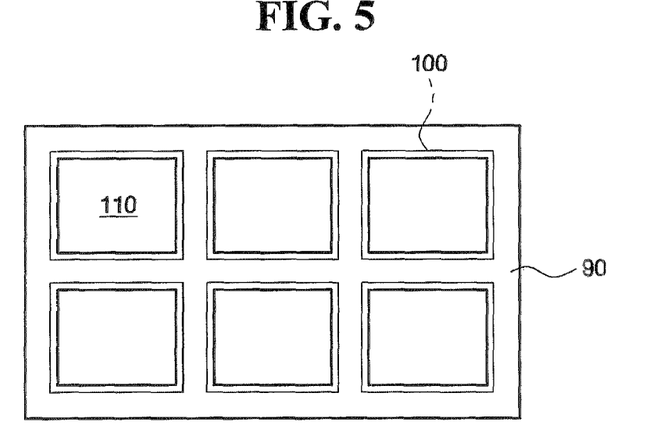
FIG. 5 is a conceptual view illustrating a second mother substrate and a color filter unit cell forming region formed at the second mother substrate, according to an embodiment of the present invention.

The second mother substrate 90 shown in FIG. 5 may have a size of, for example, 370 mm×479 mm or 550 mm×650 mm. The second mother substrate 90 may be formed with a transparent inorganic moulding compound such as planar glass or quartz, or transparent organic high polymeric moulding compounds such as polyethylene terephthalate (PET), polycarbonate (PC), or polyvinyl chloride (PVC).

The second mother substrate 90 may comprise at least one color filter unit cell forming region 100. A color filter unit cell 110 is formed at the color filter unit cell forming region 100.

Figure 6:
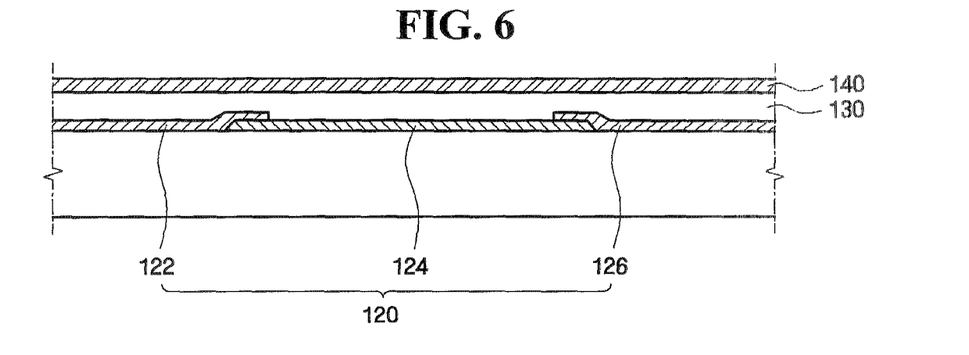
FIG. 6 is a sectional view of the color filter unit cell of FIG. 5, according to an embodiment of the present invention.

As shown in FIG. 6, the color filter unit cell 110 comprises a color filter 120, an overcoat layer 130, and a common electrode 140.

The color filter 120 can include a red color filter 122 which passes red wavelength light, a green color filter 124 which passes green wavelength light, and a blue color filter 126 which passes blue wavelength light. The red color filter 122, the green color filter 124, and the blue color filter 126 are located corresponding to the pixel electrode 80 of the TFT unit cell 30 shown in FIG. 3.

The common electrode 140 is formed with a material having high light transmissivity and good electrical conductivity. The common electrode 140 can be formed with, for example, Indium Tin Oxide (ITO) or Indium Zinc Oxide (IZO). The common electrode 140 is formed on the overcoat layer 130 and the color filter 120, and is formed over the entire color filter unit cell forming region 100.

Then, a polarizer, a buffer layer, and a transparent film are stacked on the out-side of the mother substrate (S12 of FIG. 1).

Figure 7A:
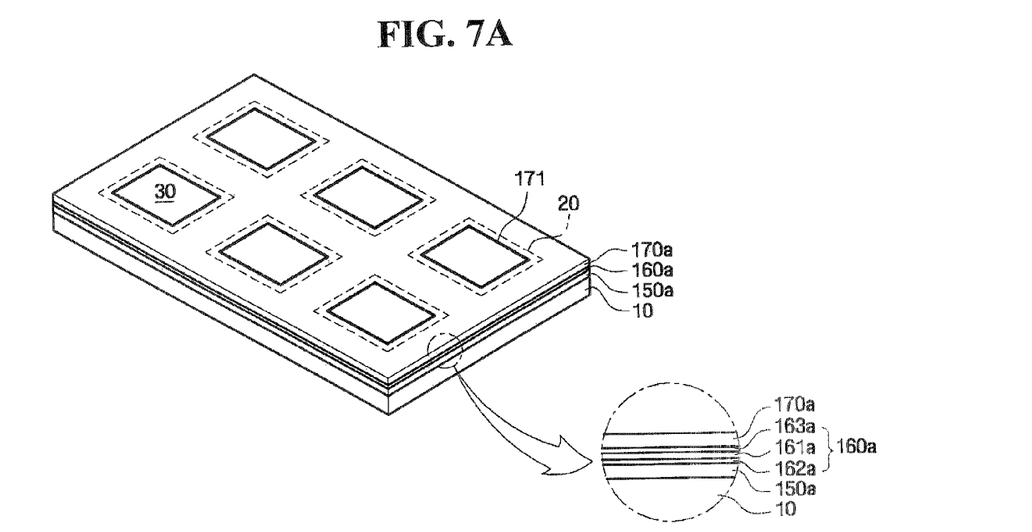
FIGS. 7A and 7B are perspective views schematically illustrating stacking a polarizer and a transparent film on a side of the first mother substrate and the second mother substrate, according to an embodiment of the present invention.
Figure 7B:
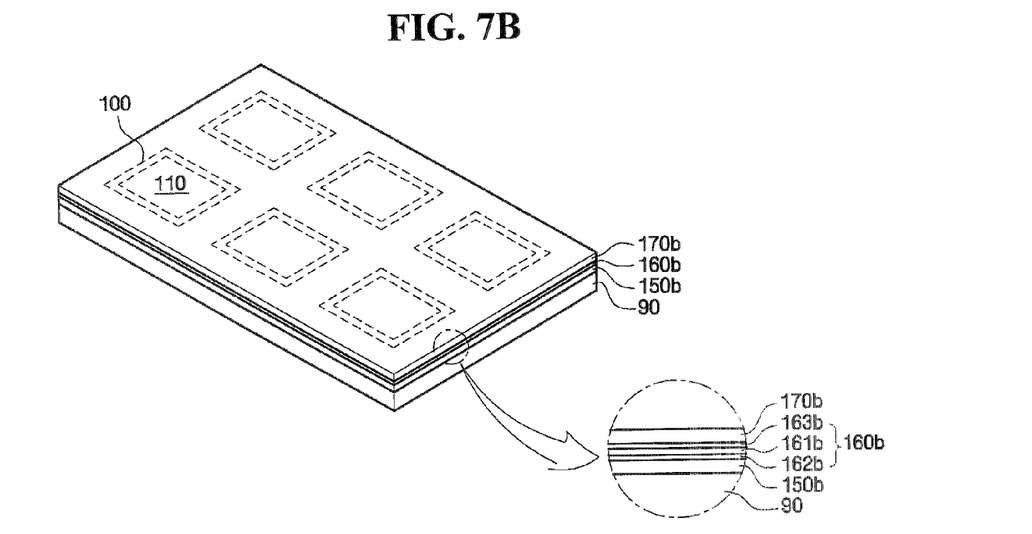

As shown in FIGS. 7A and 7B, polarizers 150a, 150b, buffer layers 160a, 160b, and transparent films 170a, 170b are stacked on the out-side of the first and the second mother substrates 10, 90 including the TFT unit cell 30 and the color filter unit cell 110, respectively.

The transparent films 170a, 170b protect the LCD from chemicals and/or scratching. The transparent films 170a, 170b, for example, can be formed with polyethylene terephthalate (PET), polycarbonate (PC), or polymethyl methacrylate (PMMA).

A print 171, which has substantially the same shape as the shape of the TFT unit cell 30 and the color filter unit cell 110, can be formed on the transparent films 170a, 170b for aiding a subsequent cutting process.

To protect the LCD from external impacts, buffer layers 160a, 160b are located between the transparent films 170a, 170b and the polarizers 150a, 150b.

The buffer layers 160a, 160b may have an adhesive properties in addition to impact absorption properties. The buffer layers 160a, 160b may be a monolayer structure comprising one layer having adhesive properties and impact absorption properties, or a multilayer structure comprising more than one layer, each layer having adhesive properties or impact absorption properties. The multlayered buffer layers 160a, 160b can comprise at least two layers having different characteristics. For example, the multilayered buffer layers 160a, 160b can comprise an adhesive layer having adhesive properties and cushion layers 161a, 161b having impact absorption properties. In an embodiment, referring to FIGS. 7A and 7B, the buffer layers 160a, 160b have first and a second adhesive layers 162a, 163a, and 162b, 163b on both sides of the respective cushion layers 161a, 161b.

The buffer layers 160a, 160b can comprise, for example, silicon resin or acryl resin. An example of the silicon resin is OPT001-60® of GEL TEC® Japan and an example of the acryl resin is CLEAR FIT® of MITSUBISHI® Japan or OCA® (Optical Clear Adhesive) of 3M® Korea. The buffer layers 160a, 160b can have a thickness of about 10 μm to about 10 mm, an adhesive strength of about 0 to about 10 kgf, and a light transmittance of at least about 60%. However, it is to be understood that the thickness, the adhesive strength, and the light transmittance can be varied according to the characteristics of the LCD.

In an exemplary embodiment, the polarizers 150a, 150b, the buffer layers 160a, 160b, and the transparent films 170a, 170b are sequentially stacked on the out-side of the respective mother substrates 10, 90.

Alternatively, the polarizers 150a, 150b may be stacked on the out-side of the first and the second mother substrate 10, 90, and the buffer layers 160a, 160b may be stacked on the transparent films 170a, 170b. Then the stacked transparent films 170a, 170b and buffer layers 160a, 160b can be stacked on the polarizers 150a, 150b.

In another exemplary embodiment, the buffer layers 160a, 160b may be formed on the transparent films 170a, 170b, and the polarizers 150a, 150b may be stacked on the buffer layers 160a, 160b. Then the stacked the polarizers 150a, 150b, buffer layers 160a, 160b, and transparent layers 170a, 170b can be stacked on the out-side of each of the first and the second mother substrate 10, 90.

Here, exemplary stacking methods include, but are not limited to, a roll-to-roll method and a vacuum adsorption method. Alternatively, the polarizers 150a, 150b, the buffer layers 160a, 160b, and the transparent films 170a, 170b can be stacked on the out-side of the first and the second substrate 10, 90 by other methods.

Then, the assembled mother substrates are formed (S13 of FIG. 1).

In order to fabricate the assembled mother substrates, fence-like liquid crystal cases (not shown) are formed in the TFT unit cells 30 or the color filter unit cells 110, where the number of the color filter unit cells 110 formed on the second mother substrate 90 is the same as the number of the TFT unit cells 30 formed on the first mother substrate 10. The liquid crystal case may comprise an ultraviolet hardening material and an adhesive material for adhering the first mother substrate 10 and the second mother substrate 90 with each other. The liquid crystal case has a band shape with a small diameter, and is formed in a closed loop shape conforming to the edge of the color filter unit cell 110 or the edge of the TFT unit cell 30.

Then, after the liquid crystal cases are formed, liquid crystal is supplied in the liquid crystal cases by a drop filling process. In order to supply liquid crystal by the drop filling process, simulation is used to estimate a proper volume of liquid crystal based on parameters including the area surrounded by the liquid crystal case and the cell gap, which is the space between TFT unit cell 30 and the color filter unit cell 110. Liquid crystal fills the plurality of areas in the liquid crystal cases using the drop filling process.

After supplying the liquid crystal to the liquid crystal cases by the drop filling process, the first mother substrate 10 and the second mother substrate 90 are assembled using the liquid crystal cases to form assembled mother substrates. For example, referring to FIG. 8, the assembled mother substrates can be formed by assembling the first and the second substrate 10, 90 by a hot press method. The hot press is performed at atmospheric pressure or reduced pressure, for example, the hot press is performed at about $10^{-1}$ torr. The hot press is performed at about 50 to about 100° C., for example, the hot press is performed at about 60° C. It is to be understood that the hot press is not restricted to these conditions, and can be performed under other pressure and temperature conditions according to the characteristics of the LCD.

Figure 8:
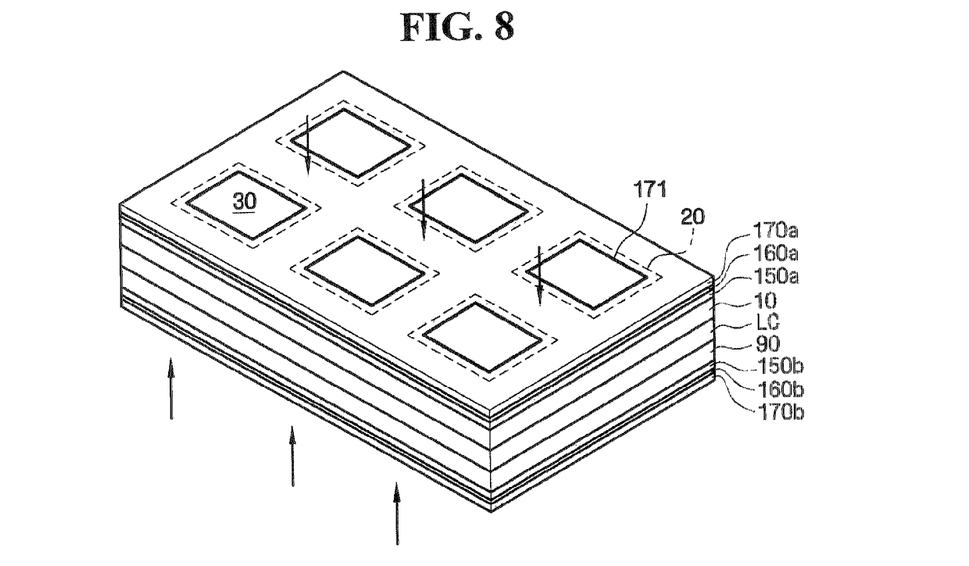
FIG. 8 is a perspective view schematically illustrating the mother substrate formed in accordance with an embodiment of the present invention.

The polarizers 150a, 150b, the buffer layers 160a, 160b, and the transparent films 170a, 170b can be more firmly adhered to the first and the second mother substrates 10, 90 by the hot press process. The combination of the TFT unit cell 30 of the first mother substrate 10, the liquid crystal (LC) layer, and color filter unit cell 110 of the second mother substrate 90 is referred to as an LCD unit cell.

The first mother substrate 10 and the second mother substrate 90 on which the LCD unit cells are formed are kept at atmospheric pressure for a predetermined time. The assembled mother substrates are kept at atmospheric pressure to uniformly spread the liquid crystal which is dropped at several spots among the TFT unit cells 30 and the color filter unit cells 110.

Then, the assembled mother substrates are cut. (S14 of FIG. 1)

Figure 9:
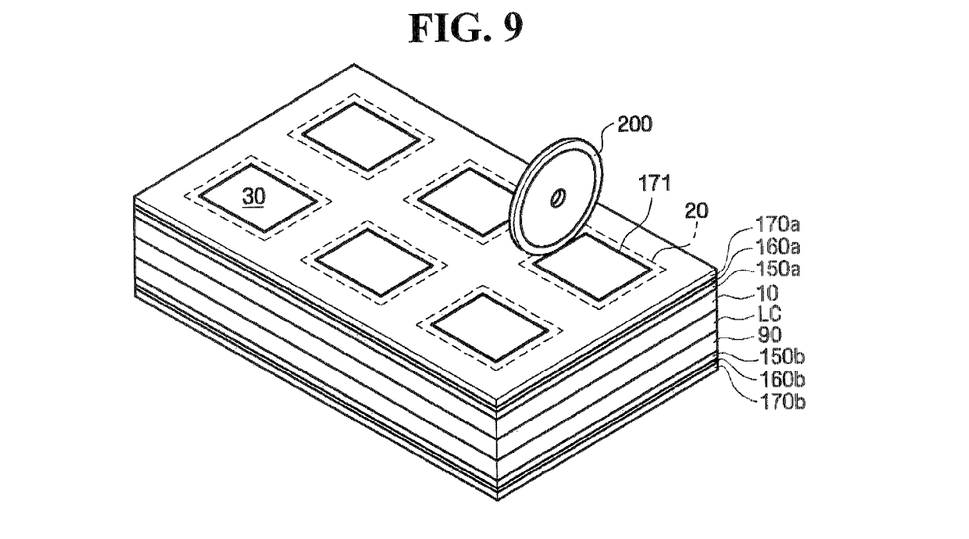
FIG. 9 is a conceptual view illustrating cutting an assembled mother substrate into a unit cell, according to an embodiment of the present invention.

As shown in FIG. 9, the assembled mother substrate, on the out-side where the polarized plates 150a, 150b, the buffer layers 160a, 160b and the transparent films 170a, 170b are stacked, and on the in-side where the LCD unit cell is formed, is cut into unit cells.

The cutting of the mother substrates is performed by laser beam cutting equipment using a non-contact method. Alternatively, cutting can be performed by a diamond wheel 200 or a blade using a contact method. If the print 171 to indicate the unit cell is formed, cutting is facilitated because the cut can be performed in accordance with the print 171.

Figure 10:
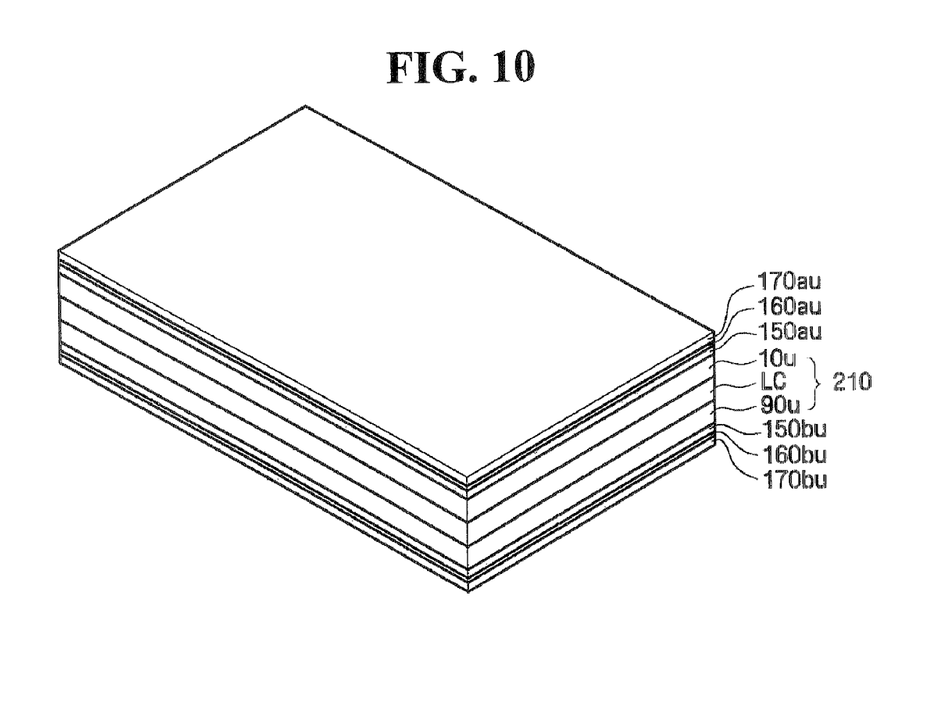
FIG. 10 is a perspective view schematically illustrating an LCD panel of an LCD fabricated by a method according to an embodiment of the present invention.

As shown in FIG. 10, the polarizers 150au, 150bu, the buffer layers 160au, 160bu and the transparent films 170au, 170bu are sequentially stacked on respective sides of an LCD panel 210 comprising a first display plate 10u, and a second display unit 90u.

Because the assembled mother substrates are cut into unit cells and fabricated as individual units, the perimeters of the LCD panel 210, the polarizers 150au, 150bu, the buffer layers 160au, 160bu, and the transparent films 170au, 170bu have the same cutting planes.

In a case where the LCD panel 210 is formed by first cutting the assembled mother substrates into unit cells, and then stacking the polarizers 150a, 150b, the buffer layers 160a, 160b, and the transparent films 170a, 170b on the LCD panel 210, each of the polarizers 150a, 150b, the buffer layers 160a, 160b, and the transparent films 170a, 170b must be cut and then stacked, thereby resulting in an extended processing time. Also, misalignment can occur when stacking the polarizers 150a, 150b, the buffer layers 160a, 160b, and the transparent films 170a, 170b on the LCD panel 210, and a margin of about 100 μm may be needed.

Alternatively, a method of fabricating a liquid crystal display (LCD), according to an exemplary embodiment of the present invention can reduce the manufacturing time because the assembled mother substrate on which the polarizers 150a, 150b, the buffer layers 160a, 160b and the transparent films 170a, 170b are staked is cut into unit cells after stacking and fabricated as individual units. Additionally, the margin for misalignment between the polarizers 150a, 150b, the buffer layers 160a, 160b, and the transparent films 170a, 170b on the LCD panel 210 can be reduced in a rage of about 20 μm to about 30 μm. As a result, the productivity of manufacturing the LCD is increased.

Then, a driver IC (not shown) is adhered to the LCD panel 210, and the LCD panel 210 is packed in a packaging container (not shown).

For example, if the LCD is used as a mobile display, the LCD is housed in a case which exposes the LCD panel 210. Here, an extra protection window is not needed, so the mobile display can be light and thin.

Hereinafter, a method of fabricating an LCD according to another exemplary embodiment of the present invention will be described with reference to FIGS. 2 through 6, and FIGS. 9 through 13.

The method of fabricating an LCD according to another exemplary embodiment of the present invention is substantially the same as the first exemplary embodiment of the present invention except that polarizers, buffer layers, and transparent films are stacked on the out-side of the mother substrates after the mother substrates are assembled.

Figure 11:
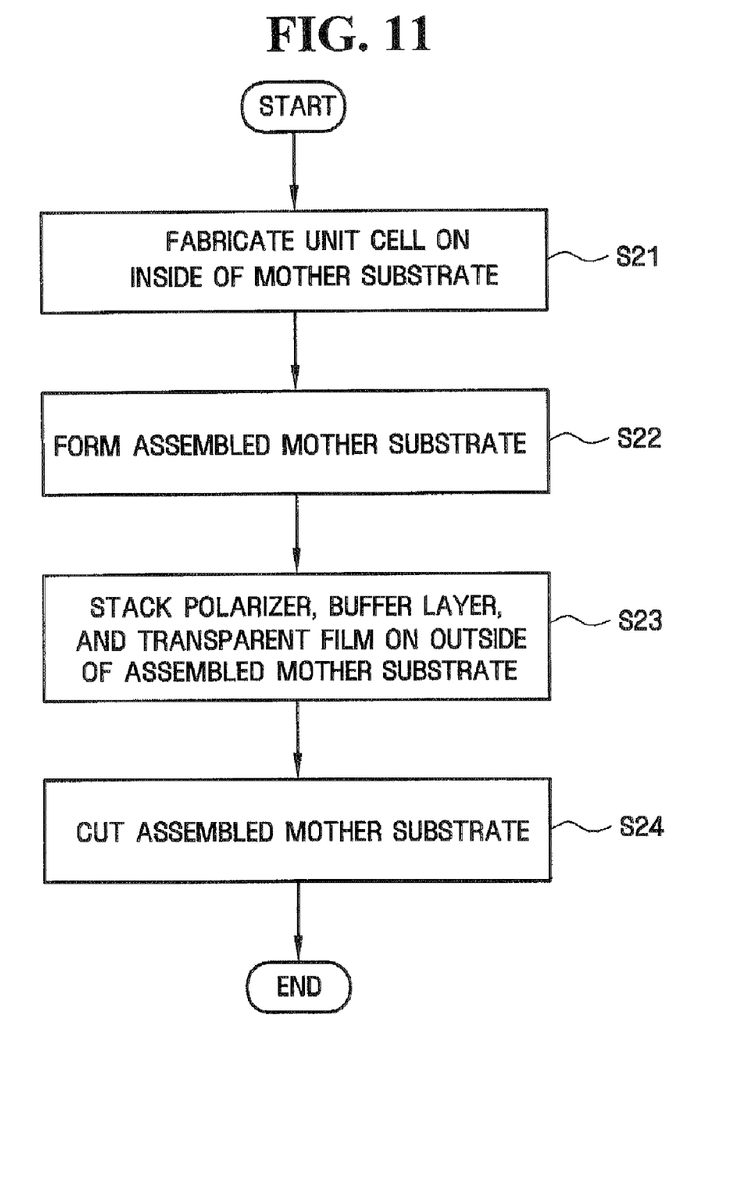
FIG. 11 is a flow chart illustrating a method of manufacturing an LCD according to an embodiment of the present invention.

Referring to FIG. 11, unit cells are formed on the in-side of each mother substrate. (S12).

In more detail, as shown in FIGS. 2 through 6, TFT unit cells 30 are formed on the in-side of a first mother substrate 10, and color filter unit cells 110 are formed on the in-side of a second mother substrate 90.

Then, assembled mother substrates are formed. (S22 of FIG. 11)

In order to fabricate the assembled mother substrates, fence-like liquid crystal cases (not shown) are formed on the TFT unit cells 30 formed on the first mother substrate 10 or the color filter unit cells 110 formed on the second mother substrate 90, and liquid crystal is dropped into a plurality of areas of the liquid crystal cases.

Figure 12:
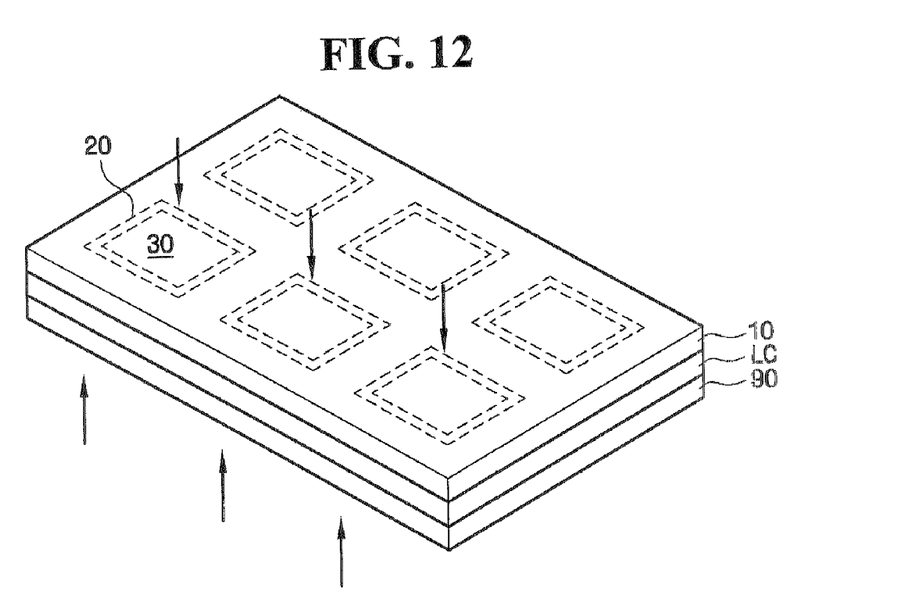
FIG. 12 is a perspective view schematically illustrating a method of manufacturing an assembled mother substrate, according to an embodiment of the present invention.

Next, referring to FIG. 12, the assembled mother substrates are formed by combining the first mother substrate 10 and the second mother substrate 90 using the liquid crystal cases. The assembled mother substrates can be formed by a hot press method. The hot press is performed at atmospheric pressure or reduced pressure, for example, the hot press is performed at about $10^{-1}$ torr. Also, the hot press is performed at about 50° C. to about 100° C., for example, at about 60° C.

The assembled mother substrates are kept at atmospheric pressure to uniformly spread the liquid crystal.

Figure 13:
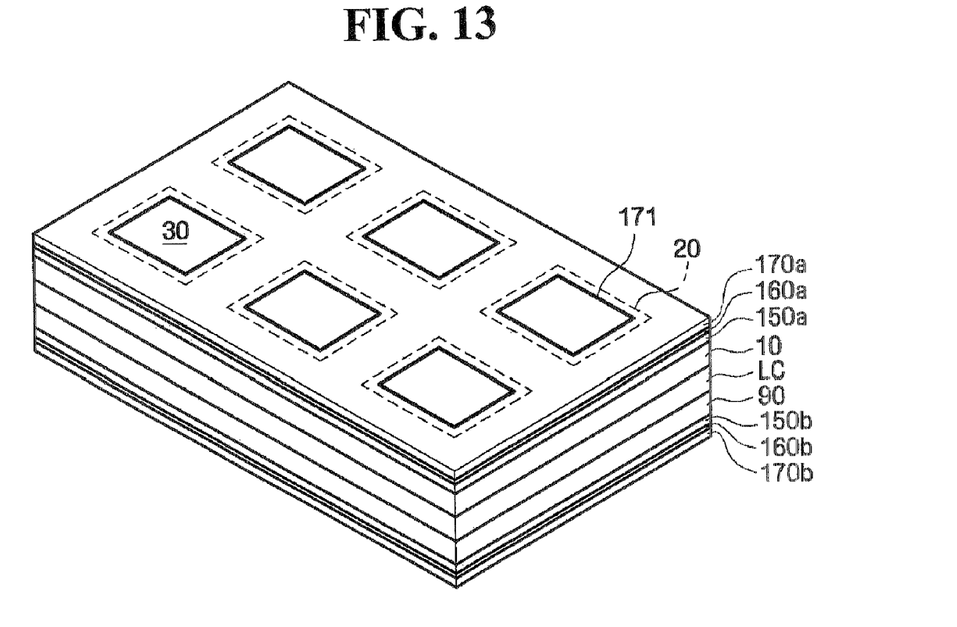
FIG. 13 is a perspective view schematically illustrating stacking a polarizer and a transparent film on an assembled mother substrate, according to an embodiment of the present invention.

Then, referring to FIG. 13, the polarizers 150a, 150b, the buffer layers 160a, 160b, and the transparent films 170a, 170b are stacked on the out-side of the respective mother substrates 10, 90, which have been assembled (S23 of FIG. 11).

As shown in FIG. 13, the polarizers 150a, 150b, the buffer layers 160a, 160b, and the transparent films 170a, 170b are stacked on the out-side of the assembled mother substrates including the LCD unit cells. The transparent films 170a, 170b protect the LCD from chemicals and/or scratching, and the buffer layers 160a, 160b protect the LCD from external impacts.

A stacking order of the polarizers 150a, 150b, the buffer layers 160a, 160b, and the transparent films 170a, 170b on the out-sides of the assembled mother substrates is the same as the previously described embodiment. A roll-to-roll or vacuum adsorption method can be used as a stacking method, but the stacking method is not restricted to these methods.

Then, the assembled mother substrates are cut (S24 of FIG. 11).

As shown in FIG. 9, the assembled mother substrates are cut into unit cells by equipment such as, for example, a laser beam and a diamond blade. As shown in FIG. 10, the perimeters of the LCD panel 210, the polarizers 150au, 150bu, the buffer layers 160au, 160bu, and the transparent films 170au, 170bu have same cutting planes.

Then, a driver IC (not shown) is adhered to the LCD panel 210, and the LCD panel is packed in a packaging container (not shown).

Hereinafter, a method of fabricating a LCD according to another exemplary embodiment of the present invention will be described with reference to FIGS. 8 through 10 and FIGS. 14 through 16.

Figure 14:
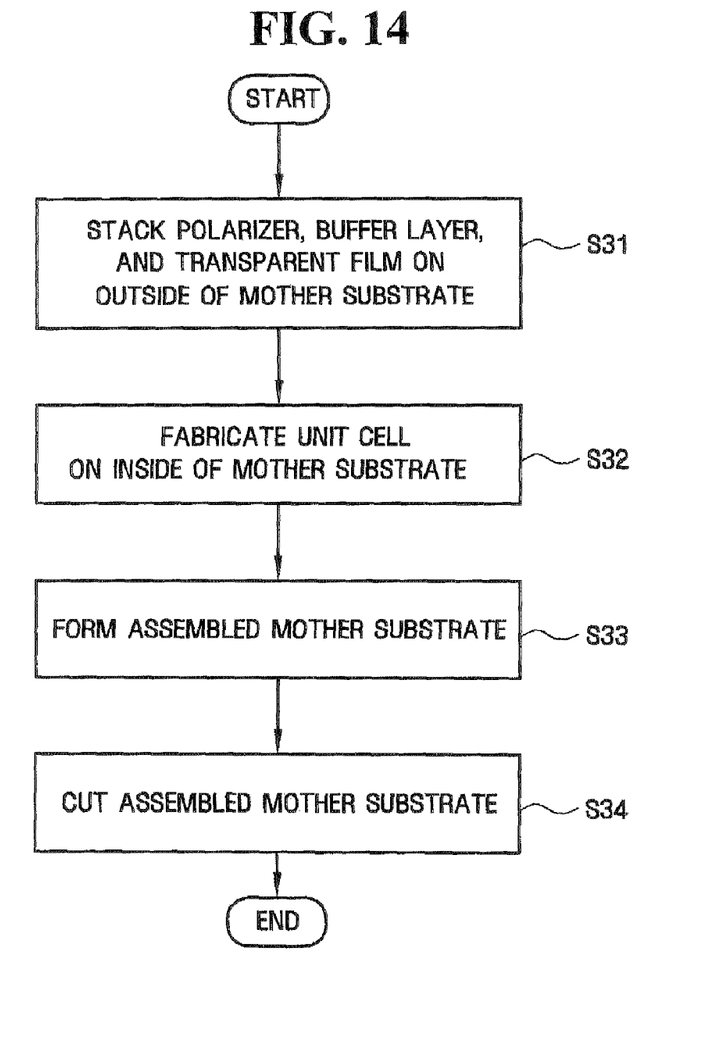
FIG. 14 is a flow chart illustrating a method of manufacturing an LCD according to an embodiment of the present invention.

The method of fabricating a LCD according to another exemplary embodiment of the present invention is substantially the same as the exemplary embodiment described in connection with FIG. 1, except that after a polarizer, a buffer layer, and a transparent film are stacked on each mother substrate, the unit cells are formed on the in-side of each mother substrate. As shown in FIG. 14, polarizers 150a, 150b, buffer layers 160a, 160b, and transparent films 170a, 170b are stacked on an out-side of each mother substrate (S31).

Figure 15A:
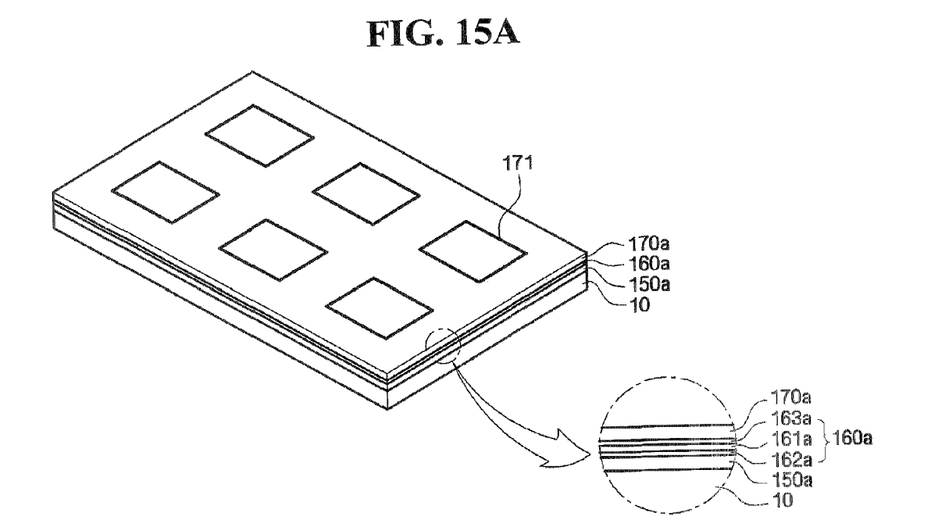
FIGS. 15A and 15B are perspective views schematically illustrating stacking a polarizer and a transparent film on a side of a mother substrate, according to an embodiment of the present invention.
Figure 15B:
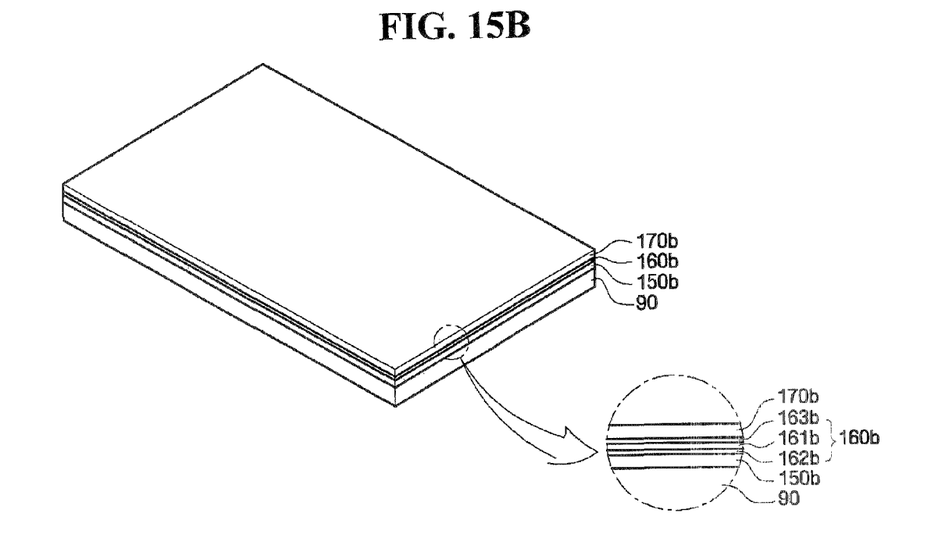

As shown in FIGS. 15A and 15B, first, the polarizers 150a, 150b, the buffer layers 160a, 160b and the transparent films 170a, 170b are stacked on the out-side of the first mother substrate 10 and the second mother substrate 90, respectively. The transparent films 170a, 170b protect the LCD from chemicals and/or scratching, and the buffer layers 160a, 160b protect the LCD from external impacts.

The order in which the polarizer 150a, 150b, the buffer layer 160a, 160b, and the transparent film 170a, 170b are stacked on the out-side of the first and the second mother substrate 10, 90 is the same as the previously described embodiments of the present invention. A roll-to-toll or vacuum adsorption method can be used as the stacking method, but other stacking methods can also be used.

Then, unit cells are formed on the in-side of the mother substrates (S32 of FIG. 14).

Figure 16A:
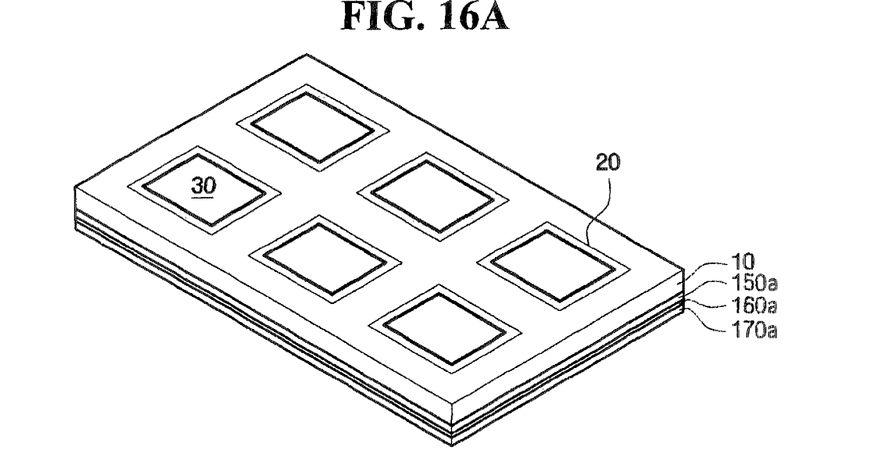
FIGS. 16A and 16B are perspective views schematically illustrating forming a unit cell on a side of a mother substrate, according to an embodiment of the present invention.
Figure 16B:
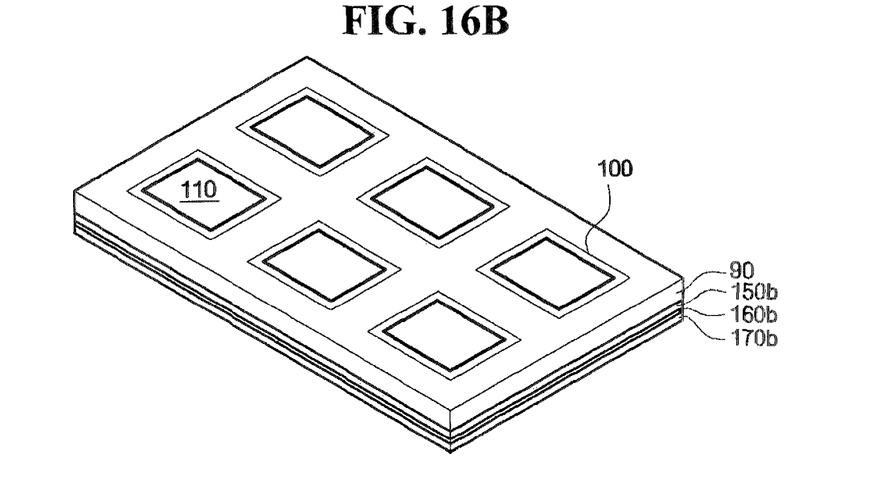

As shown in FIGS. 16A and 16B, the TFT unit cells 30 and color filter unit cells 110 are formed on each of TFT unit cell forming regions 20 and color filter unit cell forming regions 100 of the first and the second mother substrates 10, 90, on which the polarizers 150a, 150b, the buffer layers 160a, 160b and the transparent films 170a, 170b are already stacked.

Then, the assembled mother substrates are formed (S33 of FIG. 14).

Fence-like liquid crystal cases (not shown) are formed on the TFT unit cells 30 formed on the first mother substrate 10 or the color filter unit cells 110 formed on the second mother substrate 90. Then, liquid crystal is dropped into the plurality areas in the liquid crystal cases.

Next, referring to FIG. 8, the first mother substrate 10 and the second mother substrate 90 are assembled using the liquid crystal case, so the assembled mother substrates are formed. A hot press method can be used as the assembling method. The hot press is performed at atmospheric pressure or reduced pressure, for example, the hot press is performed at about $10^{-1}$ torr, and the temperature of the hot press is about 50 to about 100° C., for example, about 60° C.

Then, the assembled mother substrates are kept at atmospheric pressure for a predetermined time in order to spread the dropped liquid crystal uniformly.

Then, the assembled mother substrates are cut (S34 of FIG. 14).

As shown in FIG. 9, the assembled mother substrates are cut into unit cells, for example, by laser beam cutting equipment or by a diamond blade. As shown in FIG. 10, because the assembled mother substrates on which the polarizers 150a, 150b, the buffer layers 160a, 160b, and the transparent films 170a, 170b are stacked is cut into unit cells, the perimeters of an LCD panel 210, the polarizers 150au, 150bu, the buffer layers 160au, 160bu, and the transparent films 170au, 170bu have the same cutting plane.

Then, a driver IC (not shown) is adhered to the LCD panel 210, and the LCD panel is packed in a packaging container (not shown).

As described above, the exemplary embodiments of the present invention provide a method of fabricating an LCD which incorporates a liquid crystal drop filling process, but a liquid crystal pouring process can also be used.

Although in the exemplary embodiments of the present invention the pixel electrodes and a common electrode are formed on different substrates, the invention is not limited thereto and the pixel electrodes and the common electrode may be formed on the same substrate.

In addition, while the exemplary embodiments of the present invention have shown that a TFT and a color filter are formed on different substrates, the present invention can be applied to the case where the TFT and the color filter are formed on the same substrate.

As described above, an LCD fabricated according to exemplary embodiments of the present invention, has improved productivity, lighter weight, and smaller size.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method of fabricating a liquid crystal display, the method comprising:
 providing assembled mother substrates by sequentially stacking a polarizer, a buffer layer including a cushion layer on the polarizer, and a transparent film on the buffer layer on an out-side of at least one mother substrate; and
 fabricating the assembled mother substrates as individual units by cutting the assembled mother substrates into unit cells.

2. The method of claim 1, wherein the providing the assembled mother substrates comprises:
 forming TFT unit cells and color filter unit cells on an in-side of each of two mother substrates, respectively;
 stacking the polarizer, the buffer layer, and the transparent film on an out-side of each of the two mother substrates, respectively, after forming the TFT and the color filter unit cells; and
 assembling the mother substrates after stacking the polarizer, the buffer layer and the transparent film.

3. The method of claim 2, wherein the buffer layer has an adhesive property.

4. The method of claim 3, wherein the buffer layer includes a first adhesive layer, a second adhesive layer, and the cushion layer between the first adhesive layer and the second adhesive layer.

5. The method of claim 1, wherein providing the assembled mother substrates comprises:
 forming TFT unit cells and color filter unit cells on an in-side of each of two mother substrates, respectively;
 assembling the mother substrates after forming the TFT and the color filter unit cells; and
 stacking the polarizer, the buffer layer, and the transparent film on an out-side of the assembled mother substrates after assembling the mother substrates.

6. The method of claim 5, wherein the buffer layer has an adhesive property.

7. The method of claim 6, wherein the buffer layer includes a first adhesive layer, a second adhesive layer, and the cushion layer between the first adhesive layer and the second adhesive layer.

8. The method of claim 1, wherein providing the assembled mother substrates comprises:
 forming the polarizer, the buffer layer, and the transparent film on an out-side of each of two mother substrates, respectively;
 forming TFT unit cells and color filter unit cells on an in-side of each of the two mother substrates, respectively, after forming the polarizer, the buffer layer and the transparent film; and
 assembling the mother substrates after forming the TFT and the color filter unit cells.

9. The method of claim 8, wherein the buffer layer has an adhesive property.

10. The method of claim 9, wherein the buffer layer includes a first adhesive layer, a second adhesive layer, and the cushion layer between the first adhesive layer and the second adhesive layer.

11. A liquid crystal display (LCD), comprising:
 a liquid crystal panel;
 a polarizer formed on an out-side of the liquid crystal panel;
 a buffer layer including a cushion layer formed on the polarizer; and
 a transparent film formed on the buffer layer, wherein the perimeter of the liquid crystal panel, the polarizer, the buffer layer, and the transparent film have the same cutting plane.

12. The LCD of claim 11, wherein the buffer layer has an adhesive property.

13. The LCD of claim 12, wherein the buffer layer includes a first adhesive layer, a second adhesive layer, and the cushion layer between the first adhesive layer and the second adhesive layer.

14. A liquid crystal display (LCD), comprising:
 a liquid crystal panel;
 a polarizer formed on an out-side of the liquid crystal panel;
 a buffer layer including a cushion layer formed on the polarizer; and
 a transparent film formed on the buffer layer, wherein a margin for misalignment between each of the liquid crystal panel, the polarizer, the buffer layer, and the transparent film is in a range of about 20 µm to about 30 µm.

15. The LCD of claim 14, wherein the buffer layer has an adhesive property.

16. The LCD of claim 15, wherein the buffer layer includes a first adhesive layer, a second adhesive layer, and the cushion layer between the first adhesive layer and the second adhesive layer.

17. The LCD of claim 14, wherein the buffer layer has a thickness of about 10 µm to about 10 mm.

18. The LCD of claim 14, wherein the buffer layer has an adhesive strength of about 0 to about 10 kgf.

19. The LCD of claim 14, wherein the buffer layer has a light transmittance of at least about 60%.

* * * * *